Patented Jan. 25, 1938

2,106,314

UNITED STATES PATENT OFFICE 2,106,314

METHOD OF MAINTAINING CHESTNUTS IN PRIME CONDITION

W. Charles Anderson, Linden, Calif.

No Drawing. Application June 30, 1936, Serial No. 88,145

1 Claim. (Cl. 99—126)

This invention relates to a method whereby fresh-harvested chestnuts may be maintained in their prime, plump, smooth, and moist condition from the time of harvesting until marketed.

Chestnuts are usually harvested in early fall and the greatest market for them does not develop until some weeks later around the Christmas and New Year holidays.

Due to the inherent texture of the rind or shell of these nuts, the moisture in the kernels evaporates very readily if the nuts are allowed to remain in dry, open air. If, in an effort to prevent this evaporation, the nuts are placed in a moist atmosphere, refrigerated or otherwise, they tend to absorb additional moisture and to mold due to the development of bacteria which may be present on the nut and acquired due to various causes as for instance contact with the ground during the harvesting operation, etc.

For the above and other reasons it has therefore proven to be quite a problem to keep the chestnuts in that prime condition necessary to render them attractively marketable.

After a considerable amount of experiment, I have conceived of a method of turning to advantage those characteristics of the nuts heretofore responsible for the disadvantages above enumerated.

My improved method in brief consists in intermittently exposing the fresh chestnuts to moisture either in the form of a spray or by dipping them in water for a brief period of time to allow the same to reabsorb through their porous rinds an amount of moisture only sufficient to compensate for such loss of moisture in the kernels of the nuts as may have occurred during any previous exposure of the nuts to the open, dry air. The required periods of exposing the chestnuts to the spray or to the submersion and the subsequent aeration can of course be fixed by adequate inspection and test of the nuts and will of course vary according to existent conditions as to atmospheric temperature and humidity and the size and general characteristics of the nuts.

In detail my improved method is preferably carried out in the following described steps, although it will be obvious that such detailed procedure may well be modified in practice without departing from the spirit of the invention as defined by the appended claim.

The chestnuts to be treated may be placed in foraminous containers preferably of the large, open mesh type now commonly used for the storage of onions. Such an open mesh will allow ready passage of both moisture and air through the walls of the container and hence through the mass of nuts therein. Or in lieu of placing the nuts in such containers, the nuts may be moved in bulk on any form of conveyor found adaptable.

If the spray method is used, the nuts are moved either in the containers, or in bulk on the conveyors, through a spray zone in which zone the water is sprayed upon them for a period of time sufficient to allow the nuts to absorb sufficient moisture to return them to normal prime condition as to moisture content.

If the submersion method is to be used, a vat of suitable size is filled with water and suitable submersion apparatus is provided. If the nuts are handled in the containers, then apparatus such as crane controlled baskets or the like may be used to carry the containers into and out of the water. If the bulk method is used, then the conveyors carrying the nuts in bulk may be moved continuously through the body of water. The movement of the nuts in either event is timed to hold them in the presence of the water for a time sufficient to allow the proper amount of absorption of water to take place to return them to normal prime condition as to water content.

Since the nuts from various causes as discussed above will in many instances be initially infected with bacteria, usually mold-forming spores, I deem it essential with either method that a bactericide be added to the water in order to destroy this bacteria or at least appreciably inhibit its multiplication and development.

Preferably such a bactericide must be of such a character as not to appreciably affect the taste or flavor of the nut kernels. There are a number of such bactericides available, but I suggest chlorine as probably the most practicable as it is relatively inexpensive and as it is used largely in the purification of domestic water supplies, its bactericidal properties are well recognized and it is accepted by the consuming public as not being detrimental to health.

Naturally the strength of the bactericidal solution should be greater at the time of the first spraying or submersion in order to effectually kill if possible all bacteria on the nuts. In later sprayings or submersions, the solution could be weaker, i. e. just of sufficient strength to inhibit further development of any bacteria on the nuts, thus reducing the cost factor in practicing my method.

The nuts when withdrawn from the presence of the water would then be stored preferably in cold dry storage preferably with controlled temperature and humidity best calculated to maintain, as nearly as possible, the nuts in such prime condition without molding and without undue evaporation of the moisture therefrom.

The nuts would, however, be under observation and when the moisture content fell below that calculated to be proper, the nuts would again be subjected to the spraying or submersion step to allow of renewed absorption of moisture.

These alternate steps of exposing the nuts to moisture and storage would be repeated until the nuts were finally marketed and by the utilization of such method, the nuts would reach the market in the best possible condition.

The chestnuts might also be packed in storage in damp moss or other adaptable packing material, which would be moistened in an aqueous solution having a bactericidal content so as to inhibit any development of mold from that source.

Having thus described my invention what I claim as new and useful and desire to secure by Letters Patent is:

That method of maintaining chestnuts in prime condition which consists in exposing the nuts in the presence of moisture until they have absorbed a desired degree of moisture, then storing the nuts in a dry atmosphere until they have lost by evaporation a determined amount of moisture, then again exposing the nuts to the presence of moisture until the lost moisture has been approximately restored, and repeating such steps until the nuts are marketed.

W. CHARLES ANDERSON.